United States Patent [19]

Chikuma et al.

[11] Patent Number: 5,445,238
[45] Date of Patent: Aug. 29, 1995

[54] ELECTRIC POWER STEERING APPARATUS

[75] Inventors: Isamu Chikuma; Toshiyuki Iwano, both of Maebashi, Japan

[73] Assignee: NSK Ltd., Tokyo, Japan

[21] Appl. No.: 378,010

[22] Filed: Jan. 25, 1995

[30] Foreign Application Priority Data

Feb. 4, 1994 [JP] Japan .................. 6-012560

[51] Int. Cl.[6] ............................................. B62D 5/00
[52] U.S. Cl. ................................................. 180/79.1
[58] Field of Search ...................................... 180/79.1

[56] References Cited

U.S. PATENT DOCUMENTS

| 5,097,918 | 3/1992 | Daido et al. | 180/79.1 |
| 5,249,638 | 10/1993 | Watanabe et al. | 180/79.1 |
| 5,299,649 | 4/1994 | Sano et al. | 180/79.1 |

FOREIGN PATENT DOCUMENTS 2-108657  8/1990  Japan .

*Primary Examiner*—Mitchell J. Hill
*Attorney, Agent, or Firm*—Shapiro and Shapiro

[57] ABSTRACT

An electric power steering apparatus can maintain suitable backlash in a temperature changing atmosphere even if a gear consisting of a metallic cylindrical core portion and a toothed resin outer ring portion. The thickness of the resin outer ring portion is suitably determined by the coefficients of linear thermal expansion of a driving gear, a driven gear, a housing, the addendum of the driven gear and the center distance between the driving gear and the driven gear. Even if the temperature of the atmosphere changes, the positional relation between the gears is unchanged. Thus, the backlash is substantially unaltered.

1 Claim, 3 Drawing Sheets

ELECTRIC POWER STEERING APPARATUS

BACKGROUND OF THE INVENTION

1. Field of the Invention

The present invention relates to an electric power steering apparatus.

2. Related Background Art

There has been known an electric power steering apparatus for a vehicle in which the rotational output of an electric motor acting as an auxiliary steering torque is reduced to a suitable torque by a gear train and transmitted to the output shaft of a steering mechanism at a suitable speed. When such a steering apparatus is operated, there occurs a problem in which noise is produced between the driving gears and the driven gears of the gear train. Japanese Laid-Open Utility Model Application No. 2-108657 discloses one method of preventing such noise by forming teeth made of resin on a cylindrical metal core portion of at least either one of the driving gear and the driven gear so that noise are reduced upon engagement of the gears.

In a compound gear comprising a metal core portion and resin teeth, the coefficient of linear thermal expansion of resin is larger than that of metal. When, therefore, the thickness of resin from the addendum circle to the outer surface of the metal core portion is set to be relatively thick, the following problems occur. If the compound gear is used in an atmosphere at a high temperature, the resin portion of the compound gear is expanded remarkably. The backlash of the compound gear is reduced and the torque transmission efficiency of the compound gear and its related portion is lowered. Further, the sliding portions are worn much. When the temperature of the atmosphere around the compound gear whose backlash is determined so as to be used in the atmosphere at a high temperature is changed from a high value to a low value, the resin portion of the compound gear shrinks remarkably. Thus, the backlash of the teeth increases beyond the tolerance, noise of the teeth produced upon engagement becomes high, and delay of power transmission occurs.

SUMMARY OF THE INVENTION

The object of the present invention is to provide an electric power steering apparatus which can maintain a suitable backlash between gears under the condition at which an atmosphere surround the apparatus changes even if a compound gear made of a metallic cylindrical core portion and a resin outer ring portion is used.

An electric power steering apparatus according to the present invention comprises:

a housing;

a motor fixed to the housing and having a rotary shaft;

a driving gear connected to the rotary shaft of the motor;

an output shaft rotatably supported by the housing;

a compound driven shaft; and the driven gear comprising an outer ring portion made of an elastic material and formed with teeth engaging with the driven gear and a metallic cylindrical core portion supporting the outer ring portion and connected to the output shaft; and wherein the following equation is satisfied:

$$t + h_k + CD \cdot (k_4 - k_1)/(k_2 - k_1)$$

where t is the thickness of the outer ring portion, $k_1$ is the coefficient of linear thermal expansion of the driving gear and the metallic cylindrical core portion, $k_2$ is the coefficient of linear thermal expansion of the outer ring portion of elastic material, $h_k$ is addendum of the driven gear, and $k_4$ is the coefficient of linear thermal expansion of the housing and CD is the center distance between the driving gear and the driven gear.

In the electric power steering apparatus according to the present invention, the thickness of the outer ring portion of the driven gear is suitably determined by the above equation in connection with the efficient of the linear thermal expansion. Thus, appropriate backlash between the driving and driven gears can be maintained even if the temperature of the atmosphere around the apparatus is changed.

DESCRIPTION OF THE PREFERRED EMBODIMENT

An embodiment of the present invention will be described in detail with reference to the accompanying drawings.

Figure 1:
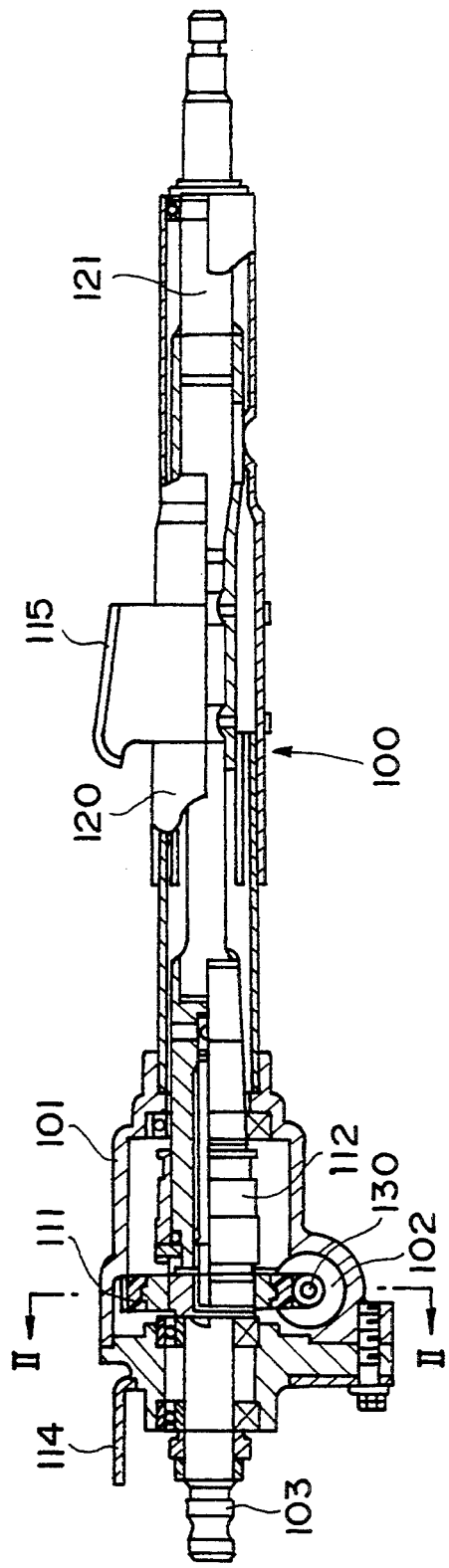
FIG. 1 is a longitudinal cross-sectional view of the main portion of an electric power steering apparatus according to one embodiment of the present invention.

FIG. 1 is a partial longitudinal cross-sectional view of an electric power steering apparatus 100 according to one embodiment of the present invention.

As shown in FIG. 1, the electric power steering apparatus 100 comprises a housing 101 and a tube 120 extending therefrom. The housing 101 is fixed to a vehicle body (not shown) by a bracket 114, and the tube 120 is also fixed to the vehicle body by a bracket 115. An input shaft 121 extends through the tube 120 having one end connected to a steering wheel (not shown) and is rotatably supported by the tube 120. The other end of the input shaft 121 is connected to a torque detecting device 112.

The torque detecting device 112 extends through the housing 101 and is connected to an output shaft 103 rotatably supported by the housing 101. The output shaft 103 is connected to a steering apparatus (not shown) so as to transmit the torque for steering wheels. The torque detecting device 112 is used to detect relative torque between the input shaft 121 and the output shaft 103, thereby to control the auxiliary steering force suitably. Since its structure is well known, its detailed description is omitted.

A worm wheel 111 is coaxially fixed to the output shaft 103 in the vicinity of the torque detecting device 112. The worm wheel 111 engages the worm gear 130b (see FIG. 2) of a transmission shaft 130 extending perpendicularly to the paper face of FIG. 1. The transmission shaft 130 is connected to the rotary shaft of an electric motor 102 (see FIG. 2).

The operation of electric power steering apparatus 100 as shown in FIG. 1 will be described. As steering torque is supplied from a steering wheel (not shown), the input shaft 121 is rotated, and the rotational torque is transmitted to the output shaft 103 through the rotational torque detecting device 112. As described above, the output shaft 103 is connected to the steering apparatus (not shown) and transmits the steering torque. In this case, the value of the torque detected by the rational torque detecting device 112 is supplied to a comparing circuit (not shown) for comparing the value of the torque with a predetermined value. When the torque exceeds the predetermined value, an auxiliary steering force is required. Thus, a driving signal for driving the motor 102 is outputted. The motor 102 operated by the driving signal rotates the transmission shaft 130, and the rotational torque is further transmitted to the output shaft 103.

When, on the other hand, the value of the torque detected by the rotational torque detecting device 112 is lower than the predetermined value, no auxiliary steering force is required. Thus, the motor 102 is not driven.

Figure 2:
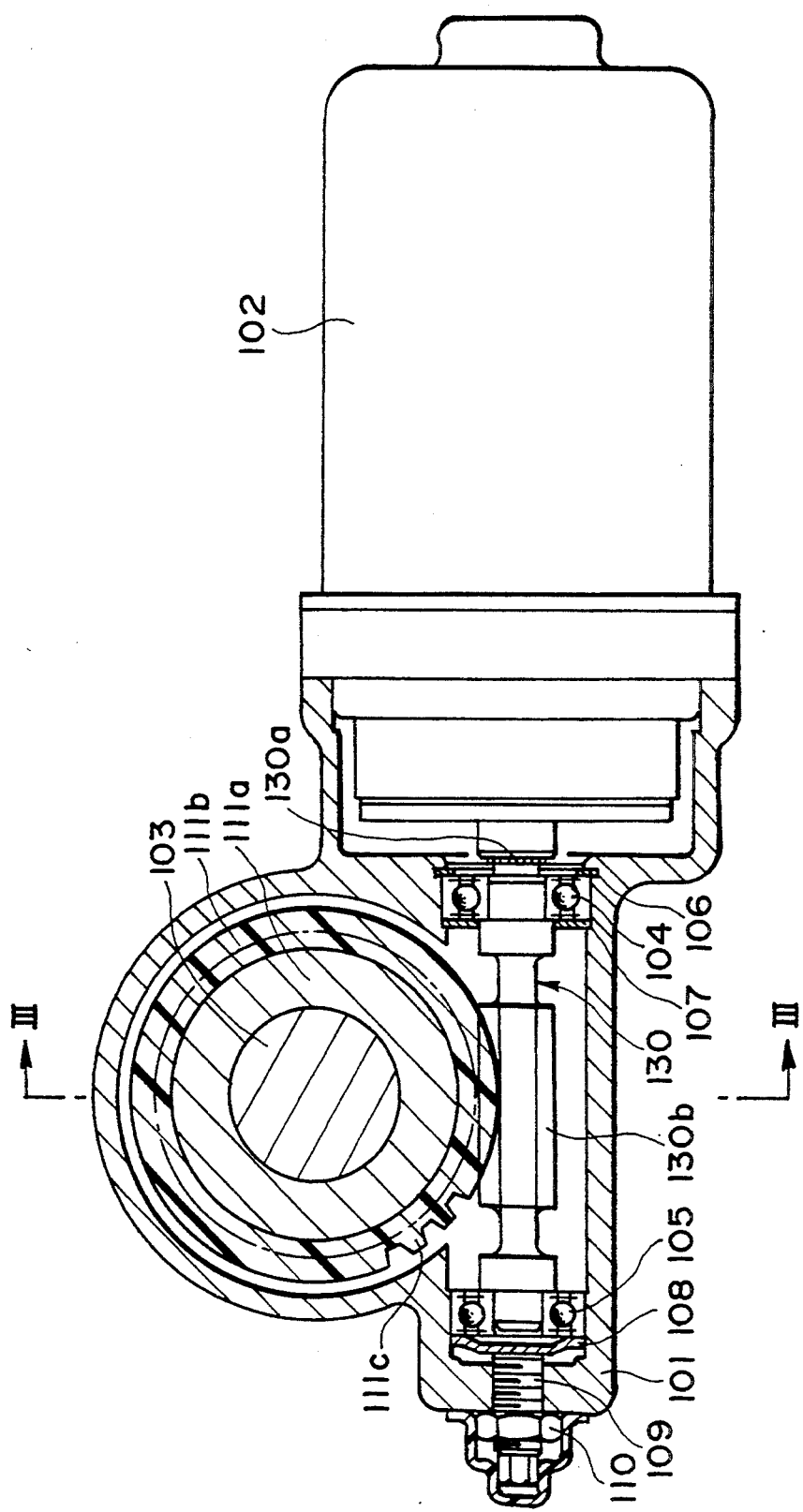
FIG. 2 is a cross-sectional view of the apparatus taken along line II—II of FIG. 1.

FIG. 2 is a longitudinal cross-sectional view of the main part of the electric power steering apparatus taken along II—II of FIG. 1. As shown in FIG. 2, the electric motor 102 is fixed to the right end of the housing 101 made of aluminum. The rotary shaft (not shown) of the electric motor 102 has a female serration portion (not shown). A male serration portion is formed on an end of the transmission shaft 130. Both serration portions engage each other so that the transmission shaft 130 and the rotary shaft of the electric motor 102 are connected together to rotate integrally.

The transmission shaft 130 has both ends rotatably supported on the housing 101 by means of bearings 104 and 105 and a central portion formed with the worm gear 130b. The worm gear 130b is made of general structural steel Japanese Industrial Standard JIS S2OC. The axial movement of the right bearing 104 with respect to the housing 101 is limited by spacers 106 and 107, and the left bearing 105 is pushed toward the right side by a bolt 109 through a spacer 108. This structure can apply suitable pre-loads to the bearings 104 and 105. A lock nut 110 prevents the bolt 109 from being loosened.

The worm wheel 111 which is a driven gear is provided above a worm gear 130a and comprises a metallic cylindrical core portion 111a made of structural steel Japanese Industrial Standard JIS S2OC and an outer ring portion 111b which is made of nylon (a kind of polyamide resin) or another elastic material, surrounds the core portion 111a and is adhered to the outer surface of the core portion 111a. Worm teeth 111c only two of which are shown in FIG. 2 are formed in the circumferential portion of the outer ring 111b. The worm wheel 111 is connected to the output shaft 103 so that the worm wheel 111 and the output shaft 103 rotate integrally. The output shaft 103 is connected to a steering mechanism (not shown).

Figure 3:
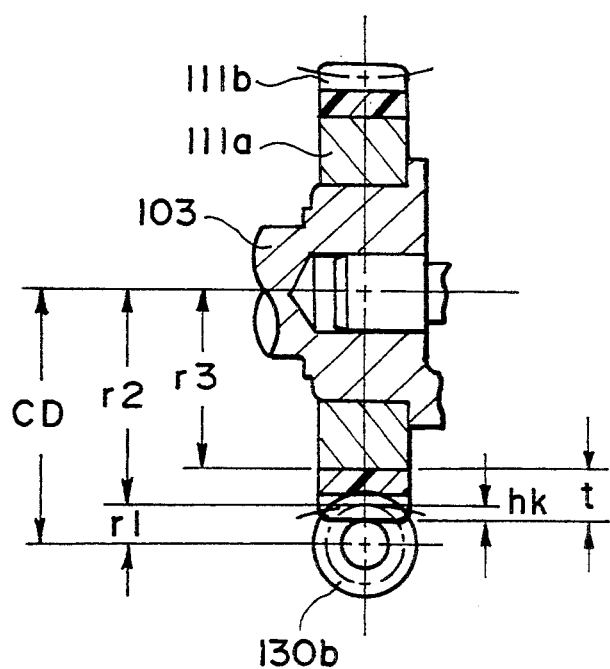
FIG. 3 is a cross-sectional view of the apparatus taken along line III—III of FIG. 2.

FIG. 3 is a cross-sectional view of the electric power steering apparatus taken along line III—III of FIG. 2 with the housing omitted from illustration. The following equation is obtained from the geometrical analysis of the arrangement of the output shaft, the worm wheel 111 and the transmission shaft 130:

$$r_1 + r_2 = CD \quad (1)$$

where $r_1$ is the intermeshing radius of the worm gear 130b, $r_2$ is the intermeshing radius of the worm wheel 111, and CD is the center distance between the worm gear 130b and the worm wheel 111.

When the amounts of linear thermal expansion of the gears and the housing are equal to each other, the change in backlash is theoretically zero. In this case, therefore, the amount of the linear thermal expansion of the worm gear 130b [$r_1 \cdot r_k$] plus the amount of the linear thermal expansion of the outer ring portion 111b [$(r_2-r_3) \cdot k_2$] should be equal to the linear thermal expansion of the housing 101 [$CD \cdot k_4$]. Therefore, the following equation is obtained:

$$r_1 \cdot k_1 + (r_2 - r_3) \cdot k_2 + r_3 \cdot k_3 = CD \cdot k_4 \quad (2)$$

where $k_1$ is the coefficient of linear thermal expansion of the worm gear 130b, $k_2$ is the coefficient of linear thermal expansion of the outer ring portion 111b of the worm wheel 111, $k_3$ is the coefficient of linear thermal expansion of the core portion 111a of the worm wheel 111, $k_4$ is the coefficient of the linear thermal expansion of the housing 101, and $r_3$ is the radius of the core portion 111a.

From Equations (1) and (2), it is obtained that $$r_2 \cdot (k_2 - k_1) - r_3 \cdot (k_2 - k_3) = CD \cdot (k_4 - k_1) \quad (3)$$

Since the worm gear 130b and the core portion 111a of the worm wheel are of the same material, $k_1$ is equal to $k_3$. Substituting this equation into Equation (3), it is obtained that $$r_2 - r_3 = CD \cdot (k_4 - k_1)/(k_2 - k_1) \quad (4)$$

The value $(r_2-r_3)$ is the distance between the tooth bottom of the outer ring portion 111b and the outer surface of the core portion 111a. Thus, this value plus the addendum $h_k$ of the worm teeth 111c is the thickness t of the outer ring portion 111b, and the thickness t of the outer ring portion 111b made of resin is to be set to:

$$t = h_k + CD \cdot (k_4 - k_1)/(k_2 - k_1) \quad (5)$$

In an example of this embodiment,
$k_1 = 1.17 \times 10^{-5}/°C$. (for S2OC)
$k_2 = 9 \times 10^{-5}/°C$. (for nylon)
$k_4 = 2.36 \times 10^{-5}/°C$. (for aluminum)
$h_k = 1.68$ mm
$CD = 33$ mm.

From Equation (5), it is obtained that $t = 6.695$ mm $\approx 6.7$ mm.

The present invention is not limited to the above-mentioned embodiment but is applicable to various modifications. For example, in place of nylon as a typical material of polyamide resin as an elastic material as used in this embodiment, another elastic material such as elastic resin other than nylon or natural rubber may be used. Instead of a general structural steel JIS S2OC, any other metal can be used as long as it satisfies Equation (5). However, the coefficient of linear thermal expansion of the material of the housing should not be higher than that of the metal portion of the gear.

As described above, the electric power steering apparatus according to the present invention has a technical advantage in that the thickness of the outer ring portion of the driven gear is suitably determined by the above-mentioned equations in connection with the coefficients of linear thermal expansion of the related members so that suitable backlash is maintained between the driving and driven gears even if the temperature of the atmosphere surrounding the apparatus changes.

What is claimed is:

1. An electric power steering apparatus which includes:

a housing;

a motor fixed to said housing and having a rotary shaft;

a driving gear connected to said rotary shaft of said motor;

an output shaft rotatably supported by said housing; and a driven gear comprising an outer ring portion made of an elastic material and formed with teeth engaging said driving shaft and a metallic cylindrical core portion connected to said output shaft, for supporting said outer ring portion, said metallic cylindrical core portion having substantially the same coefficient of linear thermal expansion as said driving gear; and wherein the following equation is satisfied:

$$t = k_h + CD \cdot (k_4 - k_1)/(k_2 - k_1)$$

where t is a thickness of said center ring portion, $k_1$ is said coefficient of linear thermal expansion of said driving gear and said metallic cylindrical core portion, $k_2$ is a coefficient of linear thermal expansion of said outer ring portion, $h_k$ is addendum of said driven gear, $k_4$ is a coefficient of linear thermal expansion of said housing, and CD is a center distance between said driving gear and said driven gear.

* * * * *